Patented Dec. 31, 1935

2,026,088

UNITED STATES PATENT OFFICE 2,026,088

MAGNESIA REFRACTORY

Frederic A. Harvey and Raymond E. Birch, Pittsburgh, Pa., assignors to Harbison-Walker Refractories Company, Pittsburgh, Pa., a corporation of Pennsylvania No Drawing. Application January 4, 1934, Serial No. 705,243

18 Claims. (Cl. 106—9)

This invention relates to magnesia refractories of improved character.

Magnesia refractories are used in various types of industrial applications because they are basic in character and because magnesia is one of the most refractory of the materials commonly used for this purpose. Due to their chemically basic character, the magnesia refractories surpass all other common refractory materials in their ability to resist the action of basic slags. Despite their refractory and chemical properties, however, the magnesia refractories as manufactured heretofore are subject to certain serious deficiencies which often militate against them.

One of the most serious of these deficiencies arises from the character of the bond in the refractories as commonly produced. The magnesia materials used to make these refractories are magnesia, or mineral compounds which on being heated sufficiently yield a product the principal constituent of which is magnesia. Thus, magnesite after being sintered to drive off the carbon dioxide and stabilize the grains, is commonly used, but other ores may be used also, such as brucite. These materials contain impurities, including silicates, which when the batch is burned melt and react with one another to form a glassy bond; it is this glassy silicate which holds the magnesia grains together in the prior magnesia refractories. This glassy bond confers great strength upon the refractories when they are cold, but at higher temperatures the glass tends to soften, and this seriously impairs the behavior of the brick in service, because when the glass softens it permits the grains to move over one another. This characteristic is commonly recognized by those dealing with magnesia brick. Thus, it has been stated recently that magnesia brick will not stand a tensile stress of more than 15 pounds per square inch at 1500° C., and in general these brick tend to squat or squeeze together, or shear, when subjected to a load of 25 pounds per square inch at the same temperature.

Hence one of the most significant deficiencies of magnesia brick has been due to the character of the bond, and in consequence the applicability of magnesia refractories has been limited. The usefulness of magnesia refractories would be greatly extended if they did not soften and become weak at relatively low temperatures. For example, silica brick melt at a much lower temperature than magnesia brick, but on the other hand silica brick can be used under load at much higher temperatures than magnesia brick.

It is among the major objects of this invention to provide magnesia refractories of improved character, which are characterized by improved strength and resistance to flow or deformation at furnace temperatures, whereby to widen the field of their applicability and otherwise to minimize the disadvantages of prior magnesia refractories. A particular object is to overcome disadvantages of magnesia refractories containing the glassy bond referred to. Other advantages will be recognized from the following description by those versed in the art.

The invention is predicated on our discovery that magnesia refractories of improved character are formed by providing between the refractory grains a network of refractory material in an amount such as to resist deformation of the refractory at elevated temperatures, and particularly that the disadvantages due to the glassy bond normally produced in magnesia refractories containing silicate impurities may be minimized and repressed by introducing into the glassy bond between the granules a reinforcing network of crystals of magnesia-silica compound which does not melt or soften substantially at high temperatures and which forms a solid phase that is stable with respect to the glassy bond when it is softened or liquefied. The use of material of high melting point insures the presence of a network of stable solids radiating between the refractory granules, even at temperatures at which the natural glassy bond referred to softens or becomes liquid. This network then supplies sufficient strength to resist the slippage of the granules over one another, as would normally occur, for example, due to the softening of the glass under heat in service. And this characteristic is retained by virtue of the fact that the material forms a crystalline phase stable with respect to the silicate bond, for it insures that the network will not be destroyed through partial solution by the glass. Moreover, the crystalline network appears to increase resistance to thermal shock; for example, at temperatures at which the usual glassy bond is hard and brittle the refractory may possess low resistance to thermal shock, but the provision of the crystal network throughout the bond reinforces the brittle glass against such effects.

The glassy bonding material of magnesia refractories may be considered, for all practical purposes of this invention, to comprise preponderantly magnesium silicates. For this reason forsterite, i. e., $2MgO.SiO_2$, is used to provide the reinforcing crystalline network used in the practice of the invention now to be described in detail. Forsterite forms the crystalline network described, it readily attains equilibrium with the glassy bond (and thus is adapted to resist solution by the glass when melted), and it may knit to the magnesia granules, by reaction therewith, thus further enhancing its reinforcing and strengthening character. Also, forsterite is the highest melting of the magnesium silicates, and unlike other compounds in this system it undergoes virtually no partial melting until its melting point is reached. Serpentine and similar magnesium silicates, on the other hand, may be converted in substantial amount to liquid long before the melting point is reached.

That this environment is conducive to the maintenance at elevated temperatures of the crystalline forsteritic bond contemplated by this invention is indicated by the fact, known previously, that traces of forsterite may be found within the glassy bond in magnesite brick after they have been cooled from the high temperatures to which they are exposed in manufacture and in service. However, in the magnesia refractories known prior to this invention forsterite has occurred only in amounts so small that at elevated temperatures, such as brick service temperatures, it has not exerted any substantial strengthening effect because the small amounts of forsterite may dissolve readily in the glassy bond at high temperatures. In accordance with the present invention, in contrast therewith, the bond is provided with an amount of forsterite or forsterite-forming material which provides abundant forsterite as a crystalline bond at all practical furnace operating temperatures, essentially to the melting point of forsterite.

The small amounts of forsterite found naturally in some of the prior magnesia refractories may have a beneficial effect in the practice of the present invention in so far as they may act as a seed to foster the development of a more continuous forsterite bond in accordance with this invention. The natural presence of forsterite is not essential to the success of the present invention, however.

The invention is applicable to refractories formed from magnesia, e. g., to refractory brick or other formed articles, as well as to furnace linings and bottoms, and other refractories, made from magnesia, or from batches containing magnesia and other materials in amount less than the magnesia, whereby the products partake of the properties of magnesia. The magnesia used may be derived from any suitable source, such as magnesite, brucite, or other magnesia ore, or electrically fused magnesia, or other source.

In the practice of the invention there is added to the magnesia refractory batch forsterite, or materials containing or productive of forsterite, in an amount such as to produce a crystalline reinforcing network throughout the glassy bond when the refractory is fired, but such that the base of the refractory remains essentially magnesia. This forsterite network then serves to minimize the loss of strength due to softening of the glassy bond under heat, and thus to resist flow of the refractory grains over one another when the glassy bond softens. Through the practice of the invention the refractories made in accordance with it will resist flow and deformation at temperatures which normally would be impracticable for magnesia refractories, because the reinforcing network of this invention prevents the softened glassy bond from exerting its normal lubricating action between the refractory grains. And, as mentioned hereinabove, the network likewise reinforces the bond to resist thermal shock.

In the preferred practice of the invention the forsterite is added as such to a suitable refractory batch, and the forsterite may be either of natural mineral or of artificial origin. Pure forsterite may be used, but it is seldom found in nature; more usually the forsterite is combined with a ferrous silicate, and in this form it is relatively common in rocks referred to variously as olivine, dunite, paridotite, chrysolite, and others, any of which may be used, although for the purposes of the invention the proportion of ferrous silicate to forsterite in such rocks should not be too high, as otherwise the rock will not be refractory enough for the purpose of the invention. The higher the content of forsterite the better the material will be for the purposes of the invention. Satisfactory results may be obtained, for example, with dunites of approximately the following composition:

| | Percent |
|---|---|
| $SiO_2$ | 40.6 |
| MgO | 47.6 |
| FeO | 7.5 |
| $Al_2O_3$ | 1.1 |
| CaO | 0.1 |
| $Cr_2O_3$ | 0.8 |
| Ignition loss | 1.2 |

Of course, materials containing greater amounts of iron oxide might be used as long as the refractoriness of the rock is not markedly lower than that of a dunite of the composition just given.

Olivines and similar materials containing a predominant amount of forsterite likewise offer ideal raw material for producing the crystalline reinforcing network upon which this invention is predicated.

In addition to rocks composed predominantly of forsterite, such as those just mentioned, there are rocks which consist in large part of the alteration products of olivines and similar rocks high in magnesia, examples being serpentine, talc, soapstone, and other hydrous magnesium silicates and ferro-magnesium silicates. For the most part these materials as they occur naturally are not suitable for the purposes of this invention because the alteration processes which they have undergone have converted them from olivine to materials of lower refractoriness, and because they are characterized by instability when heated, causing shrinkage and other changes of state or constitution.

Because rocks of this general class occur naturally in all stages of alteration there is no sharply defined distinction between rocks composed predominantly of forsterite and those constituted mainly of the hydrous silicates, such as serpentine. Even the purest olivines will generally contain traces of the hydrous silicates, but they are wholly satisfactory for the purposes of the invention. Likewise, olivine or forsterite crystals are found in almost all talcs, serpentines, and similar materials.

However, although the highly serpentinized and highly steatitized materials are not directly suitable for our purpose in their natural form, they may be treated to render them suitable for the purposes of the invention. Thus, such hydrous magnesium silicates as serpentine and talc may be enriched in magnesia, as by adding free magnesia, to bring their MgO content to not less than substantially that in forsterite, i. e., 57 per cent. The material enriched in magnesia in this manner may then be heated suitably to convert it largely to forsterite, which is then added to the magnesia refractory batch for the purpose described. In preparing forsterite in this manner the temperature used may be that necessary to effect reaction, and the operation may be conducted in any suitable manner, as in a rotary kiln. Or, the mix may be melted if desired.

A similar procedure may be used with olivines and the like where they contain appreciable amounts of hydrosilicates due, for example, to weathering and other natural alteration processes.

Likewise, other suitable materials may be used to produce the necessary forsterite network. In all instances where magnesia is added to a magnesium silicate for this purpose, the MgO content produced should be at least 57 per cent, this being the proportion of magnesia in forsterite. In some instances it may be desirable to have still larger amounts of magnesia present, the excess of magnesia over that required by the forsterite ratio tending to combine with the natural magnesium silicates in the glassy bonding material to form additional forsterite crystals, which actually reduces the amount of glass present by partially converting it to forsterite.

The use of an excess of MgO in producing forsterite for addition to refractory batches is advantageous also for other reasons. Thus, most natural magnesian minerals contain iron compounds in solid solution in the grains of mineral, and in serpentine, or weathered olivines and the like, the grains, as a result, may be surrounded by talc and hydrous iron compounds. Iron in such forms usually is of low melting point, which is, of course, undesirable in a refractory. By the addition of excess magnesia it is possible to convert the iron to magnesium ferrite, $MgO.Fe_2O_3$, which has a high melting point.

Of great significance is the stability of the forsterite network, formed throughout the glassy bond upon firing the refractory, with respect to the glass-like bond, whereby its deformation-resisting qualities in the fired refractory do not depreciate substantially. Thus, the glassy bonding silicates are extremely corrosive to many crystals. Forsterite crystals, however, at any given furnace temperature, reach an equilibrium with the glassy bonding silicates, which belong to the same system ($MgO.SiO_2$), and under equilibrium conditions the crystals cannot be dissolved or corroded by the molten silicates. From this standpoint also it may be desirable to use an excess of magnesia in the materials used to produce forsterite for addition to the batch, for the excess MgO may accelerate the attainment of equilibrium conditions. Actually, the attainment of equilibrium conditions may cause the forsterite crystals both to grow and to increase in number under appropriate temperature conditions. This will produce a better knit and more coherent body. Moreover, the melting point of forsterite is so high as to retain the crystalline network throughout the bond at very high operating temperatures. For instance, forsterite is considered to have a melting point of about 1890° C., and, as mentioned hereinabove, it does not exhibit any material amount of melting until its ultimate melting point is reached.

The examples given of the material used in producing the crystalline network throughout the bond between the grains represent forsterite sources which are typical in carrying out the invention. The practices discussed hereinabove may vary, however, in details so long as the material used is such as to produce a substantial amount of forsterite crystal aggregates in the glassy bond between the magnesia refractory grains, and the amount of forsterite material used is selected suitably to this end.

A magnesia refractory of this type not only embodies all of the advantages of those used heretofore, such as refractoriness, basicity, low temperature strength, and others, but also is more highly resistant to the corrosive action of basic slags and fluxes than are refractories which consist essentially of forsterite. And the products provided by the invention are unique as regards their high temperature properties. The softening temperatures of the glassy silicates vary for different types of magnesite, but the collapse of ordinary magnesia brick under light load, such as 25 pounds per square inch, at temperatures usually below 1550° C., shows that in most instances the silicate impurities partially melt at lower temperatures. In contradistinction, forsterite melts at 1890° C., or 300° to 400° C. above the natural silicates which are present in most magnesia refractories. This combines with the reinforcing character of the forsterite to confer satisfactory strength at higher loadings and temperatures than heretofore.

The following examples are illustrative of the practice of the invention:

Example 1

Refractory brick or other shapes are made from a mixture of 85 per cent dead burned (sintered) magnesite and 15 per cent of natural olivine rock. The dead burned magnesite may be any of the types used in making magnesia brick, for example, an Austrian magnesite analyzing approximately 85 per cent MgO, 5 per cent $Fe_2O_3$, 4 per cent $SiO_2$, and 6 per cent of other materials. A suitable olivine rock is one in which the iron (represented as FeO) does not exceed 10 per cent.

The dead burned magnesite may be ground to pass a screen having 3 meshes per linear inch, and the olivine is ground to pass a screen having 70 meshes per linear inch. The materials are then thoroughly mixed in any suitable type of mixer or grinder, for example an ordinary wet pan, and at this point it is usually advantageous to add about 5 per cent by weight of water. The batch is then formed by any of the usual processes. Advantageously a mechanically actuated press which yields pressures in excess of 1000 pounds per square inch is used. The product may then be dried, if desired, although this is not essential, and the shapes are then fired in a kiln.

Advantageously the refractory is fired to about 1425° C., although under some conditions, dependent on the atmospheric conditions in the kiln, any temperature above 1100° C. may be suitable. Also, to bring out a suitable development of some properties of the refractory the pressed ware may be fired to temperatures considerably above 1425° C., if this seems advisable.

Example 2

Refractory products are manufactured from a mixture of 90 per cent of dead burned magnesite, and 10 per cent of an artificial forsteritic composition prepared by grinding together, say to pass a 20 mesh screen, a mixture of serpentine and sufficient dead burned magnesite in whatever proportion analysis of the serpentine shows is necessary to convert it to forsterite. Or, as indicated hereinabove, amounts of magnesia in excess of the forsterite ratio may be used. This artificial forsterite-producing mixture is then molded suitably, with water and an organic binder, and fired to 1500° C. The magnesite and forsterite materials may then be worked up to make the refractory articles, for example in accordance with Example 1.

In Example 1 reference was made to the use of magnesite ground to pass a 3 mesh screen. There is nothing limiting in this granule size, however, as other grinds as fine as 20 mesh may be used, or grinds so sized as to give approximately maximum density of packing of the granules. In general, however, the magnesia should be coarsely granular, and the forsteritic material fine, relative to each other.

We now believe that the action of the foresteritic material in improving the magnesia refractory is greater when the forsterite is of fine particle size, for example, that indicated in Example 1. Separate fine grinding of the forsterite material thus is preferable to produce grains finer than the average size of the magnesia grains. Such separate fine grinding, however, is not always essential, since some rocks, for example olivines, are so soft that they may be crushed suitably simultaneously with the dead burned magnesia grains. Due to the fact that these rocks are less hard than the magnesia, the olivine readily breaks down into the desired finer sizes, the magnesia remaining comparatively coarse. Such concurrent grinding of the two materials, however, is usually less efficient than grinding them separately, and where used it will usually be desirable to increase the amount of forsteritic material over that which would be used if the materials were ground separately.

Although reference has been made to mixing the material in a wet pan with water, and then pressing shapes from them, it will be understood that various bonding agents may be added to the batch for various purposes, for example, to give the pressed ware sufficient strength to allow shipping without previous firing. For example, the materials described in Examples 1 and 2 could be mixed with a small percentage of waste sulfite liquor from paper manufacture, and after the pressed materials are thoroughly dried they are strong enough to ship unfired for installation in industrial furnaces, the ware being then fired in use.

It may in some instances be desirable to use small percentages of materials of the type generally referred to as mineralizers, or catalysts. These will be particularly desirable in connection with the use of mixtures of magnesia and serpentinized and the like materials and which are to be converted into forsterite. Thus, materials such as fluorspar, boric acid, and other known mineralizers which tend to accelerate the conversion of the material into forsterite may be used in small quantities, usually not exceeding about 2 per cent. These are especially desirable for use in preparing a forsteritic material for use in the practice of the invention, but such mineralizers may be added also to the refractory batch together with forsteritic material, particularly where the latter contains MgO in excess of the forsterite ratio.

It will be understood also that the invention is not restricted to practice in the manner described. Thus, it is not limited to the use of batches whose refractory grains consist of magnesia; on the contrary, the invention is also applicable to refractory batches containing magnesia and other materials in lesser amounts. For instance, it may be applied to batches containing magnesia and chrome ore, the latter component being used in an amount less than the magnesia. Likewise, electrically fused magnesia may be used instead of that of sintered or dead burned origin as referred to hereinabove, with production of a network of forsterite crystals between the granules.

The invention is applicable also to various modes of producing these refractories. For example, it may be applied to forming furnace, e. g., open hearth, linings or bottoms from suitable refractory compositions containing olivine or other forsteritic material, and fusing the bottom in place in the customary manner.

As a further indication of the general applicability of the invention to magnesia refractory products, reference may be made also to its embodiment in articles bonded with small amounts of clay, or the like. According to one mode of making such refractories the batch is formed from a major proportion of magnesia (preferably low in or free from lime), with or without chrome ore, and a minor proportion of clay for bonding, together with an agent which causes the clay to gelatinously coat the refractory particles. Acid electrolytes, such as sodium bisulfate, are suitable for the latter purpose. By finely dividing the clay and using such an agent it is possible to reduce the amount of clay normally required. The present invention may be applied in making such refractories, by adding forsterite to the batch in the manner described hereinabove.

According to the provisions of the patent statutes, we have explained the principles of our invention and have described what we now consider to represent its best embodiment. However, we desire to have it understood that, within the scope of the appended claims, the invention may be practiced otherwise than as specifically described.

We claim:

1. In the production of magnesia refractories, the step comprising incorporating with magnesia refractory grains a minor proportion but more than about 5 per cent of a forsteritic material and thereby providing a refractory which will contain crystalline forsterite as a bond between said refractory grains at temperatures as high as 1600° C.

2. In the production of magnesia refractories the step comprising incorporating with granular magnesia refractory forsteritic material in an amount more than about 10 per cent and less than the content of magnesia refractory, thereby providing refractory containing crystalline bonding forsterite at temperatures as high as 1600° C.

3. In the production of magnesia refractories, the step comprising incorporating with granular magnesia refractory forsteritic material in an amount between about 10 and 35 per cent, thereby providing refractory containing crystalline bonding forsterite at temperatures as high as 1600° C.

4. The method of improving the strength at elevated temperatures of a magnesia refractory containing a glassy bond between the refractory grains which comprises adding to the refractory from about 5 to about 50 per cent of forsteritic material and thereby providing a bonding network containing crystalline forsterite at temperatures as high as 1600° C.

5. In a method of making magnesia refractories, the steps comprising preparing a batch of granular magnesia refractory containing silicate impurities, adding thereto forsteritic material in an amount more than about 10 per cent and less than the magnesia refractory, said forsteritic material having been previously prepared by heating magnesia-silica material containing at least 57 per cent of MgO, and forming the batch to make shapes, and thereby providing a refractory containing a bonding network containing crystalline forsterite at temperatures as high as 1600° C.

6. In a method of making magnesia refractories, the steps comprising preparing a batch of granular magnesia refractory containing silicate impurities, adding from about 5 to about 50 per cent of finely divided forsterite material, and forming and firing the refractory mix, and thereby providing a refractory containing forsterite bond between the refractory grains and providing crystalline forsterite at temperatures as high as 1600° C.

7. A method according to claim 6 in which electrically fused magnesia constitutes said granular magnesia refractory.

8. In a method of making magnesia refractories, the steps comprising preparing a refractory batch containing granular magnesia and chrome ore in an amount less than the magnesia, the batch containing silicate impurities, adding a minor proportion but more than about 5 per cent of forsterite material, and forming and firing the refractory mix, and thereby providing a refractory having between the refractory grains a forsterite bond containing crystalline forsterite at temperatures as high as 1600° C.

9. In a method of making magnesia refractories, the steps comprising providing a batch of granular magnesia refractory, adding a minor proportion but more than 5 per cent of relatively finely divided olivine composed largely of magnesium orthosilicate, and forming the batch, and thereby providing a refractory whose bond, after firing, contains and is strengthened by said magnesium orthosilicate in crystalline state at temperatures as high as 1600° C.

10. In a method of making improved magnesia refractories, the steps comprising preparing a refractory batch containing granular electrically fused magnesia, adding from about 5 to about 50 per cent of forsterite material, and forming and firing the refractory mix, and thereby providing a refractory the bond of which contains and is strengthened by said magnesium orthosilicate in crystalline form at temperatures as high as 1600° C.

11. A method according to claim 10, said forsterite material comprising olivine composed largely of magnesium orthosilicate.

12. A magnesia refractory comprising a major amount of granular basic refractory material, and a bond between the refractory grains containing from about 5 to 35 per cent of crystalline forsterite.

13. A magnesia refractory comprising a major amount of refractory material composed chiefly of granular magnesia, a bond between the refractory grains including glassy bonding material and from about 10 to about 50 per cent of bonding forsterite distributed through said bond in the form of a crystalline network and providing crystalline forsterite bond at temperatures as high as 1600° C.

14. A magnesia refractory comprising a major amount of refractory material composed chiefly of granular electrically fused magnesia, and a minor amount of bond containing from about 5 to about 50 per cent of forsterite in the form of a crystalline bonding network.

15. A magnesia refractory formed from a mix comprising a major proportion of granular magnesia material containing silicate impurities productive of a glassy bond between the refractory grains, and from about 5 to 35 per cent of forsteritic bonding material which provides a bonding network of crystalline forsterite at high temperatures.

16. A magnesia refractory formed from a mix comprising a major proportion of granular magnesia containing silicate impurities productive of a glassy bond between the refractory grains, and a minor amount but more than about 5 per cent of olivine composed largely of magnesium orthosilicate forming a crystalline bonding network for said granular magnesia, said forsterite remaining crystalline at high temperatures.

17. The method of making improved magnesia refractories comprising the steps of preparing a refractory batch containing a major proportion of granular burned brucite, adding to the batch a minor amount but more than about 5 per cent of finely divided forsteritic material, and forming and firing the refractory mix, and thereby providing a refractory containing crystalline bonding forsterite at elevated temperatures.

18. An unburned magnesia refractory composed of a major proportion of granular magnesia refractory, from about 5 to about 50 per cent of forsteritic material, and a temporary bonding agent for bonding the mixture until fired, said forsteritic material upon firing providing a bonding network providing crystalline bonding forsterite at temperatures as high as 1600° C.

FREDERIC A. HARVEY.
RAYMOND E. BIRCH.